United States Patent [19]

Glaeser

[11] Patent Number: 5,240,793
[45] Date of Patent: Aug. 31, 1993

[54] ALKALINE BATTERIES CONTAINING A ZINC POWDER WITH INDIUM AND BISMUTH

[75] Inventor: Wolfgang Glaeser, Goslar, Fed. Rep. of Germany

[73] Assignee: Grillo-Werke AG, Duisburg, Fed. Rep. of Germany

[21] Appl. No.: 765,006

[22] Filed: Sep. 24, 1991

Related U.S. Application Data

[63] Continuation of Ser. No. 446,536, Dec. 6, 1989, abandoned.

[30] Foreign Application Priority Data

Dec. 7, 1988 [DE] Fed. Rep. of Germany ....... 3841068

[51] Int. Cl.$^5$ .................... H01M 4/42; C22C 18/00
[52] U.S. Cl. .................... 429/206; 429/229; 429/231; 420/513
[58] Field of Search .................... 420/513; 75/352; 429/229, 231, 206

[56] References Cited

U.S. PATENT DOCUMENTS

| | | | |
|---|---|---|---|
| 3,928,074 | 12/1975 | Jung et al. | 429/229 |
| 4,118,551 | 10/1978 | Chireau et al. | 429/231 |
| 4,404,117 | 9/1983 | Gugenberger | 429/229 |
| 4,606,984 | 8/1986 | Vignaud | 429/231 |

FOREIGN PATENT DOCUMENTS

| | | |
|---|---|---|
| 893551 | 7/1982 | Belgium . |
| 123919 | 7/1984 | European Pat. Off. . |
| 1086309 | 4/1960 | Fed. Rep. of Germany . |
| 61-153950 | 7/1986 | Japan . |
| 61-290652 | 12/1986 | Japan . |
| 62-123658 | 6/1987 | Japan . |
| 63-006747 | 1/1988 | Japan . |
| 63-006749 | 1/1988 | Japan . |

OTHER PUBLICATIONS

Patent Abstracts of Japan, vol. 10, No. 356, Nov. 29, 1986, 61-153,949.

Primary Examiner—R. Dean
Assistant Examiner—Margery S. Phipps
Attorney, Agent, or Firm—Wegner, Cantor, Mueller & Player

[57] ABSTRACT

The zinc powder for alkaline batteries having a residual lead content of less than 30 ppm, an indium content of from 10 to 10,000 ppm, and preferably from 100 to 1,000 ppm, a gallium content of from 0 to 1,000 ppm and a content of alkali and/or alkaline earth metals of up to 1,000 ppm additionally contains from 10 to 10,000 ppm, and preferably from 100 to 1,000 ppm, of bismuth.

11 Claims, No Drawings

ALKALINE BATTERIES CONTAINING A ZINC POWDER WITH INDIUM AND BISMUTH

This application is a continuation of U.S. patent application Ser. No. 07/446,536 filed Dec. 6, 1989, now abandoned.

The present invention relates to a zinc powder for alkaline batteries and a process for preparing same with a very low gas evolution in the alkaline electrolyte by alloying or applying metal into or onto zinc.

Zinc powder is suitable for use in alkaline batteries only if it exhibits a sufficiently low hydrogen gas evolution in the electrolyte also in the absence of current delivery. To this end, zinc powder in general is passivated with lead and mercury. The mercury passivation may be effected either as a so-called subsequent amalgamation after the powder production or by powdering zinc amalgam.

Since presence of mercury is to be avoided in batteries for reasons of environmental protection, many attempts have already been made to reduce the mercury content by addition of other metals or even to avoid an addition of mercury completely. Hereto, reference is made to the EP-A-0 123 919. All conventional zinc powders for alkaline batteries, more specifically if low in or free from mercury, contain considerable amounts of lead. These amounts of lead either are present already in the starting material, for example, if so called "Huttenzink" [smelter zinc] has been employed, or the lead has been subsequently added as an alloy component to the neat zinc. The amounts of lead added in general are between 0.03 and 3% by weight. For example, 0.05% by weight, corresponding to 500 ppm, of lead are capable of reducing the gas evolution of neat zinc from 1.2 ml/25 g at 70° C. within 24 h to 0.10 ml of gas. The Examples of the above-mentioned EP-A-0 123 919 also exhibit lead contents of between 0.05 and 2.7% by weight.

In the meantime, higher importance has also been attached to the toxicity and environmental pollution produced by lead so that there is a demand to reduce the lead content of alkaline batteries. It should be noted that also neat zinc, depending on the processes by which it has been prepared, still contains some residual amounts of lead which, however, are always below 30 ppm, in part below 20 ppm as well or even below 10 ppm.

Now it was surprisingly found that it is also possible to obtain zinc powder having a residual lead content of less than 30 ppm suitable for alkaline batteries, if said zinc powder contains at least 10 to 10,000 ppm, and preferably 100 to 1,000 ppm, of indium and additionally 10 to 10,000 ppm, and preferably 100 to 1,000 ppm, of bismuth.

For further optimization, this zinc powder may still comprise a gallium content of from 0 to 1,000 ppm and a content of alkali and/or alkaline earth metals of up to 1,000 ppm.

In a further preferred embodiment, the zinc powder according to the invention contains known zinc corrosion inhibitors. These include the following compounds, among others: Terephthalic acid, biphenylcarboxylic acid, bisphenylcarbonitrile, malachite green, benzotriazole, p-aminobenzoic acid, pyridinylacetic acid, oxamide, dimethylformamide, ethanol, aromatic amines such as mono-, di- and tribenzylamine, sulfonated benzylamines, N-decylpyridinium chloride, 2,6-di-(pyridine-N--methyl)-4-methylphenol dichloride, dimethylol urea, ethyleneglycol, diethyleneglycol, triethyleneglycol, surfactants such as polyoxyethylene alkylamine, poly-oxyethylene alkylether and polyoxyethylene alkylphenylether. However, it is to be noted that some of the above-mentioned substances may also act as activators, depending on the concentration thereof. As further agents for preventing corrosion of zinc there may be contemplated added amounts of zinc oxide and tetrabutylammonium hydroxide or zinc oxide, tetraethyl-ammonium bromide and tetrapropylammonium hydroxide. Furthermore, zinc may be protected against corrosion by the addition of potassium silicate.

Particularly good results are achieved if the bismuth content is less than or equal to the content of indium. Preferably, the bismuth and indium contents are within a range of from 1:3 to 1:1.

The preparation of the zinc powder according to the invention is effected, for example, by alloying zinc with the desired amounts of additives and atomizing the molten alloy in a per se known manner. However, it is also possible subsequently to treat a zinc powder containing no or just a few of the alloying additives with aqueous solutions of the components as additionally desired, and then to wash and dry the obtained product. A preferred embodiment consists of atomizing the molten alloy by means of a mixture of gas and water, the amount of water having been selected so that it is completely evaporated due to the heat content of the powder particles.

A further method of atomizing the alloy consists of pelletizing the molten alloy, grinding the pellets to form a powder and, if so desired, removing the proportions of fines and oversize by sieving. Preferred particle sizes for zinc powders in alkaline batteries are between 70 and 600 $\mu$m. Commercially available products often have grain size distributions of between 75 and 500 $\mu$m.

The mentioned corrosion inhibitors may be incorporated in the zinc powder according to the invention in a per se known manner. In the simplest case, the substances in the form of their solutions are contacted with the zinc powder. Upon subsequent drying the corrosion inhibitors are then left to remain on the zinc powder. On the other hand, it is conceivable as well that the inhibitors are added to the battery electrolyte.

The gas evolution is generally measured in an alkaline electrolyte produced by dissolving 400 g of KOH and 40 g of ZnO and filling up with water to 1,000 ml. The gas evolution was measured in a Duran glass flask having a capacity of 100 ml of electrolyte. 25 g of zinc powder were weighed in for each sample, and the amount of gas was measured after 24 hours and 48 hours, respectively.

Some typical compositions of the zinc powder according to the invention and the amounts of gas evolved therefrom are described in the following examples.

EXAMPLE 1

A fine zinc having a residual lead content of below 20 ppm was alloyed with 0.08% by weight of indium and 0.08% by weight of bismuth, and the alloy was atomized in a known manner. The fraction of between 75 and 500 $\mu$m was separated off by sieving and subjected to a closer investigation. At 70° C. 25 g of the obtained zinc powder produced 0.02 ml of gas in 24 h and 0.16 ml of gas in 48 h.

EXAMPLE 2

The same fine zinc as in Example 1 was alloyed with 0.032% by weight of indium and 0.023% by weight of bismuth, and the alloy was processed to give a powder. Under the same conditions as in Example 1, the fraction of between 75 and 500 μm produced 0.12 ml of gas in 24 h and 0.22 ml of gas in 48 h.

EXAMPLE 3

The same fine zinc as in Example 1 was alloyed with 0.03% by weight of indium and 0.06% by weight of bismuth, and the alloy was processed to give a powder. Under the same conditions as in Example 1, the obtained powder produced 0.32 ml of gas in 24 h and 0.72 ml of gas in 48 h.

EXAMPLE 4

The same fine zinc as in Example 1 was alloyed with 0.01% by weight of indium, 0.01% by weight of bismuth and 0.01% of barium, and the alloy was processed to give a powder. Under the same conditions as in Example 1, the obtained powder produced 0.27 ml of gas in 24 h and 0.64 ml of gas in 48 h.

COMPARATIVE EXPERIMENT

The same fine zinc without any alloying additives, processed to form a powder under the same conditions, produces 1.2 ml of gas in 24 h.

The same fine zinc, alloyed with 0.05% of lead, under the same conditions as in Example 1, produced 0.10 ml of gas in 24 h.

I claim:

1. An alkaline battery, comprising: a zinc powder, which is substantially free from mercury, consisting of a lead content of less than 30 ppm, an indium content of 10 to 1,000 ppm and a bismuth content of 10 to 1,000 ppm, balance zinc and trace impurities; and
an alkaline electrolyte, the electrolyte exhibiting low hydrogen gas evolution in the presence of the zinc powder.

2. The battery of claim 1, wherein the indium content of the zinc powder is 100–1,000 ppm.

3. The battery of claim 1, wherein the bismuth content of the zinc powder is 100–1,000 ppm.

4. The battery of claim 2, wherein the bismuth content of the zinc powder is 100–1,000 ppm.

5. The battery of claim 21, wherein the bismuth content in the zinc powder is less than or equal to the indium content.

6. The battery of claim 5, wherein the relative amount of bismuth in the zinc powder with respect to the amount of indium is within the range of from 1:1 to 1:3.

7. The battery of claim 1, further comprising a zinc corrosion inhibitor.

8. The battery of claim 1, wherein the zinc powder contains gallium in an amount not greater than 1,000 ppm.

9. The battery of claim 1, wherein the zinc powder contains at least one member selected from the group consisting of alkali and alkaline earth metals in an amount not greater than 1,000 ppm.

10. The battery of claim 1, wherein the zinc powder contains barium.

11. In an alkaline battery comprising an alkaline electrolyte, the improvement comprising a zinc powder, which is substantially free from mercury, consisting of a lead content of less than 30 ppm, an indium content of 10 to 10,000 ppm and a bismuth content of 10 to 10,000 ppm, balance zinc and trace impurities, the alkaline electrolyte exhibiting low hydrogen gas evolution in the presence of the zinc powder.

* * * * *